(No Model.)

S. F. COUES.
CATERER'S DISH.

No. 261,811. Patented July 25, 1882.

Witnesses:
H. C. McArthur
W. R. Keyworth

Inventor:
S. F. Coues,
per
J. W. Alexander
Attorney.

N. PETERS, Photo-Lithographer, Washington, D. C.

UNITED STATES PATENT OFFICE.

SAMUEL F. COUES, OF BROOKLYN, ASSIGNOR OF ONE-HALF TO JOSEPH J. WALTON, OF NEW YORK, N. Y.

CATERER'S DISH.

SPECIFICATION forming part of Letters Patent No. 261,811, dated July 25, 1882.

Application filed March 16, 1882. (No model.)

*To all whom it may concern:*

Be it known that I, SAMUEL F. COUES, of Brooklyn, in the county of Kings and State of New York, have invented certain new and useful Improvements in Caterers' Dishes; and I do hereby declare that the following is a full, clear, and exact description thereof, reference being had to the accompanying drawings, and to the letters of reference marked thereon, which form part of this specification.

This invention relates to means for facilitating the sending out and the convenient serving of hot meals by caterers, either singly or in numbers; and the nature of my invention consists in the combination of a deep dish, which is divided in a suitable manner by partitions, for keeping separate different articles of food, with a removable cover which is constructed with an annular flange on its back and provided with a jointed handle, said cover, when inverted, serving as the dining-plate, as will be hereinafter explained.

The following description of my invention, when taken in connection with the annexed drawings, will enable others skilled in the art to fully understand it.

Figure 1:
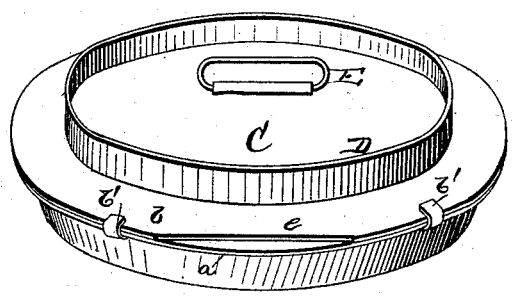
Figure 2:
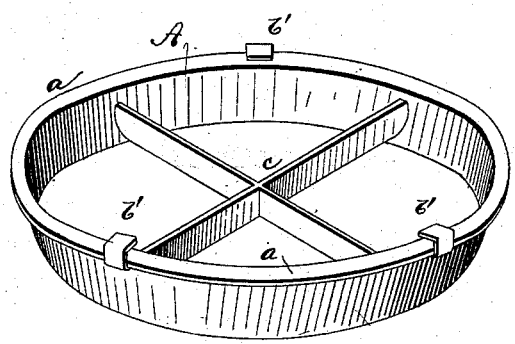
Figure 3:
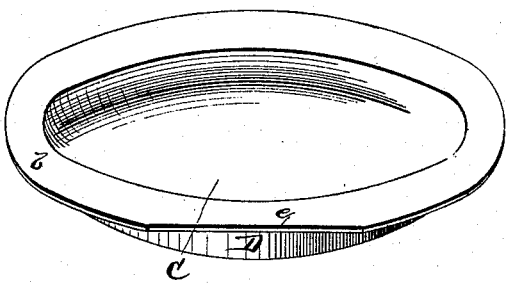
Figure 4:
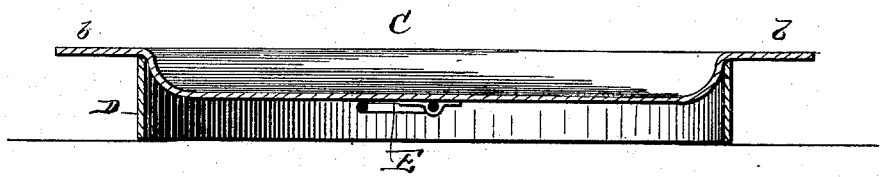

In the annexed drawings, Figure 1 is a perspective view of the dish and its plate cover combined. Fig. 2 is a perspective view of the dish without the plate cover. Fig. 3 is a perspective view of the plate cover inverted and detached from the dish. Fig. 4 is a diametrical section through the plate cover.

A designates a deep dish or circular receptacle for food. This dish is constructed with a flat horizontal rim or flange, $a$, to which a corresponding rim or flange, $b$, of a cover, C, may be secured by means of hooked lips $b'$, as shown in Fig. 1, or by any other suitable means. The dish A is divided into compartments by means of partitions $c$, of any desired height, which compartments are designed for keeping separate different kinds of food.

The cover C is dished, as shown in Fig. 4, and secured concentrically to its back is a circular flange, D, of sufficient depth to afford a good steady support for the cover when it is inverted and rested upon a table. In this last-named position the cover serves as a dining-plate, as shown in Figs. 3 and 4.

E designates a loop-handle, which is pivoted to the back of the cover-plate C, inside of the flange D, and which is used for removing the cover-plate from the dish A and applying the same thereto. The handle E can be turned down out of the way when the cover is reversed to be used as a plate.

The dish and cover-plate may be constructed of metal, with a porcelain surface, or of any other suitable material.

It will be seen that a portion of the flange $b$ of the plate cover C is cut away at $e$, so that by adjusting said flange upon the top of the dish and beneath two of the lips $b'$, and giving the cover a slight turn, the latter will be securely confined upon the dish.

Having described my invention, I claim—

1. In combination with the flanged dish, constructed with or without compartments and with suitable fastenings, the removable, flanged, and dished cover, constructed with a supporting-flange, and adapted to serve, when reversed, as a dining-plate, substantially as described.

2. The combination of the dish provided with hooked lips on its flange, with a removable dish-cover provided with a supporting-flange and a pivoted handle, substantially as and for the purposes described.

3. The new article of manufacture consisting of the flanged dish A, fastenings $b'$, the removable dished plate cover, the flanged support for this cover when it is used as a dining-plate, and the pivoted handle therefor, substantially as and for the purposes described.

In testimony that I claim the foregoing as my own I affix my signature in presence of two witnesses.

SAMUEL F. COUES.

Witnesses:
F. I. WINTER,
E. G. WALKER.